Nov. 21, 1950 W. S. HLAVIN 2,530,524
LIQUID TREATING DEVICE

Filed May 16, 1945 2 Sheets-Sheet 1

INVENTOR.
William S. Hlavin
BY
Stoodling and Krost
attys.

Nov. 21, 1950     W. S. HLAVIN     2,530,524
LIQUID TREATING DEVICE
Filed May 16, 1945     2 Sheets-Sheet 2

INVENTOR.
William S. Hlavin
BY
Woodling and Krost
attys

Patented Nov. 21, 1950

2,530,524

UNITED STATES PATENT OFFICE 2,530,524

LIQUID TREATING DEVICE

William S. Hlavin, Cleveland, Ohio

Application May 16, 1945, Serial No. 594,121

5 Claims. (Cl. 204—217)

My invention relates to an apparatus for treating water, and more particularly to an apparatus for electrically treating water as the water flows therethrough.

An object of my invention is the provision of an apparatus for removing scale and preventing formation of scale in a tank.

A further object of my invention is the provision of an apparatus for treating water flowing therethrough which has a revoluble electrode revolved by the water and stationary wipers for cleaning the revoluble electrode while the apparatus is in operation.

A further object of my invention is the provision of an apparatus having an electrical circuit which uses a leakage reactance transformer to limit the current flowing through the water being treated.

Still a further object of my invention is the provision of an electrical apparatus for preventing the formation of scale on water tanks which has an electrical switch operated by the water flowing through the apparatus for controlling the energizing of the electrodes therein.

Still a further object of my invention is the provision of an electically operated apparatus for treating water which may be inserted in a water conduit to electrically treat the water as it flows therethrough.

Another object of my invention is the provision of a water treating apparatus which may be placed in a water line and which is automatically operated by the water flowing through the line.

Anther object of my invention is the provision of a water treating apparatus which has a graphite sleeve for one of its electrodes and a Monel metal rod mounted within the graphite sleeve as the other electrode.

Other objects and a fuller understanding of my invention may be had by referring to the following description and claims, taken in conjunction with the accompanying drawing, in which:

Figure 1 of my drawing is a diagram showing of my water treating apparatus connected to a water tank;

It has been discovered that to maintain successful operation of electrical water treating apparatus, the electrodes within the apparatus should be clean. The electrodes which are clean maintain a smooth surface whereas, the electrodes which are not clean become coated with a material of higher electrical resistance than the electrodes themselves. This high resistance coating which is deposited from the water causes the electrode surface to have a varying resistance, thus destroying a uniform electrical field about the electrodes. Current leaving the electrode will tend to take the path of least resistance, thus resulting in a concentration of current at different points on the electrode surface. This concentration of currents at these points on the electrode surface causes the current to pit the surface. This pitting action will continue until the electrode has been completely destroyed. Another result of this pitting is that the water flowing through the apparatus is not properly treated. In previous apparatus of this type, it has been customary to frequently remove electrodes from the apparatus and clean them. The apparatus had to be pulled out of operation and torn apart to clean the electrodes. I have employed a revoluble electrode and stationary wipers which continuously clean the electrodes while the water treating apparatus is in operation. The electrode is revolved by the water flowing through the apparatus.

Another requirement for successful operation of an electrical water treating apparatus is to limit the current flowing through the water from one electrode to the other. In previous practice several devices which require manual setting were used for maintaining the current of the proper value and to compensate for water of different conductivity resulting from varying hardness, salt content, or foreign matter. In my apparatus, I have used a leakage reactance transformer to automatically maintain the current through the water at a proper value. The leakage reactance of the transformer varies with the conductivity of the water to maintain the correct current flow through the water.

Figure 1:
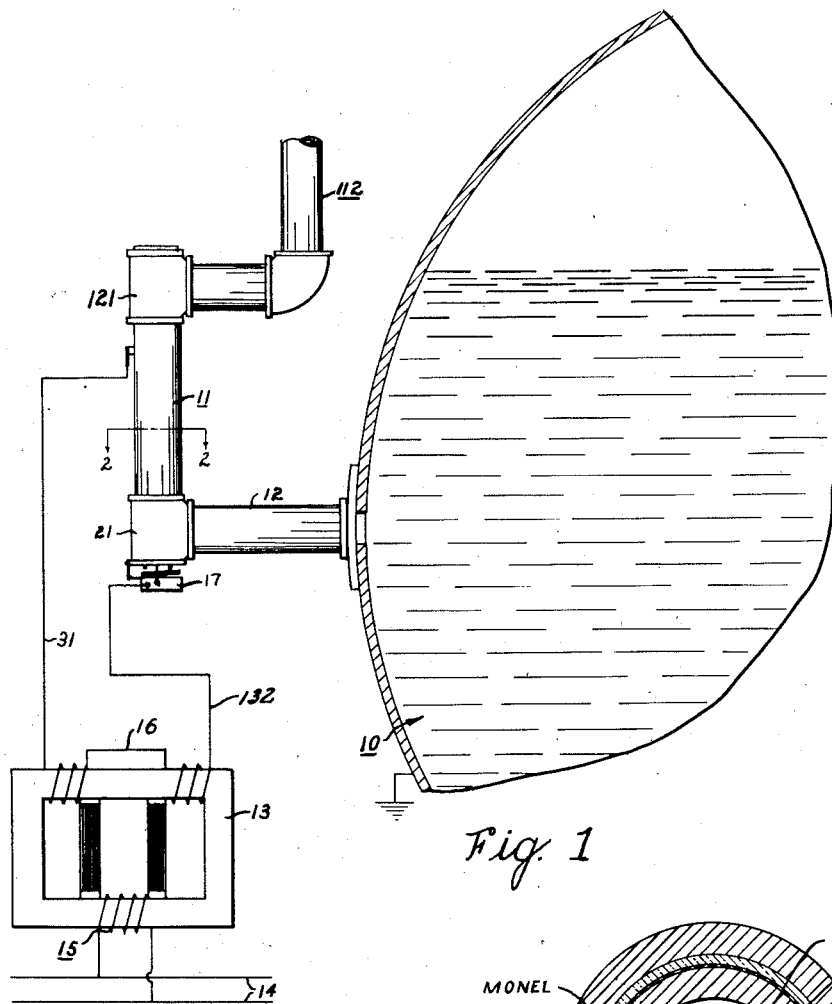

With reference to my drawings, and in particular to Figure 1, the reference character 10 represents a water tank which has a feed supply pipe 12. My water treating apparatus or device 11 is inserted between the feed supply pipe 12 and a water line 112. The tank 10 may be maintained at ground potential as illustrated by the symbol in my drawing. The current for treating the water is supplied from the secondary 16 of a leakage reactance transformer 13 which has its primary 15 electrically connected to a source of alternating current supply 14. A switch 17 which is operated automatically by the water flowing through the apparatus 11 opens and closes the electrical circuit from the secondary 16. The switch 17 automatically operates the treating device 11 when water starts to flow through the water treating device 11 and into the tank 10.

Figure 2:
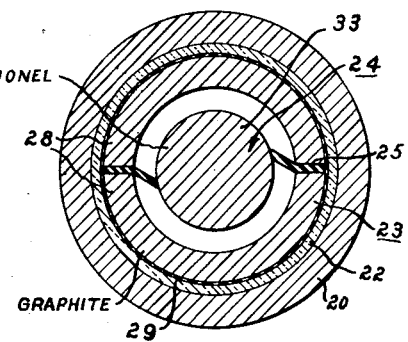
Figure 2 is a cross-sectional view taken along the lines 2—2 of Figure 1, showing the features of my invention.
Figure 3:
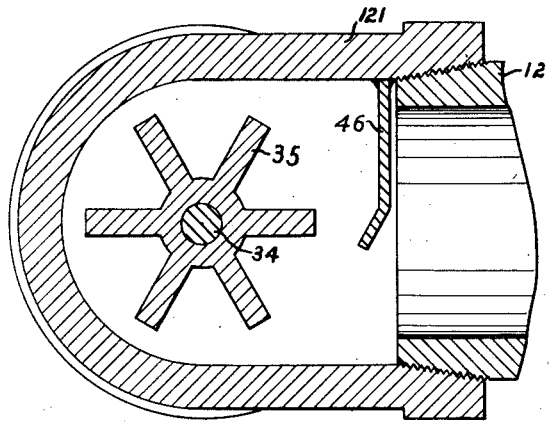
Figure 3 is an enlarged and fragmentary view taken along the lines 3—3 of Figure 4, showing principally the impeller wih other parts omitted for clarity.
Figures 4, 5, 6:
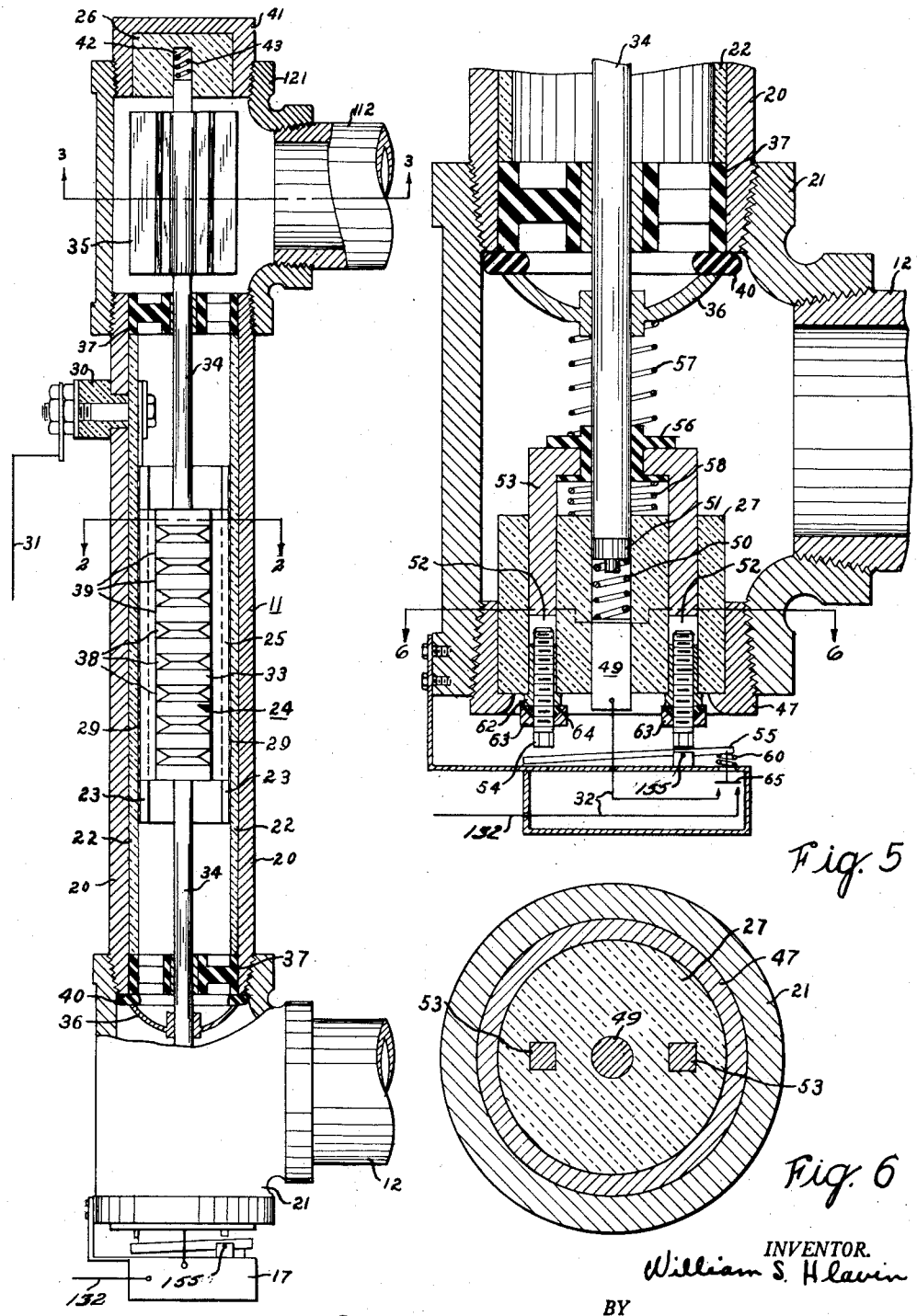
Figure 4 is a longitudinal sectional view of my water treating apparatus.
Figure 5 is an enlarged and fragmentary view of an end portion of Figure 4, parts being shown in section to illustrate the features of my electrical switch means.
Figure 6 is a view taken along the lines 6—6 of Figure 5.

My water treating apparatus or device 11 has an outer tube 20 with a T 21 on one end thereof and a T 121 on the other end thereof. The outer tube 20 and the T's 21 and 121 may be made from commercial water piping equipment. As shown in Figures 2 and 4, the outer tube 20 is lined with ceramic material 22. This ceramic lining may be enamel porcelan or other ceramic materials such as glass which is impermeable to water and also functions as an electrical insulator. The ceramic lining 22 extends throughout the length of the outer tube 20. A graphite electrode 23 and a Monel electrode 24 are supported within the ceramic lining 22. The graphite electrode 23 is of a sleeve shape and carries wipers 25 which clean the Monel electrode 24.

The graphite electrode 23, which is shorter than the ceramic lining 22, is located substantially equi-distant from the ends of the ceramic lining. For purposes of clarity in my drawings, I have illustrated a graphite electrode which is constructed from two "half sleeves" of graphite 28. Wipers 25 may be compressed between the half sleeves to force the half sleeves 28 outwardly against the ceramic lining 22 to hold them stationary therein. The wipers may be made of rubber or other suitable electrically insulated material. Rubber-like material 29 surrounds the two half sleeves 28 and fits within the ceramic lining. The rubber-like material may be in the form of tape in which case the two half sleeves 28 and the wipers 25 may be wrapped with the tape before the graphite electrode 23 is pressed into the ceramic lining. Other suitable means may be employed to support the wipers 25 and the graphite electrode 23. The two graphite half sleeves 28 which form the graphite electrode 23 are connected together electrically and to the water-tight insulated terminal 30 which has a terminal element extending outwardly through the outer tube 20. The insulated terminal 30 is electrically connected through a lead wire 31 to the secondary 16 of the leakage reactance transformer 13, thus providing means for energizing the graphite electrode 23.

The Monel electrode 24 has a Monel electrode body 33 and a shaft 34. The Monel electrode body 33 is shorter than the graphite electrode 23 and is positioned intermediate the ends of the graphite electrode 23. The Monel electrode body 33 is substantially cylindrical in shape and has a diameter less than the inside diameter of the graphite electrode 23. On the surface of the Monel electrode body 33 are V-shaped grooves 38 which are at spaced intervals along the body and extend around the Monel electrode body 33. The surface area of the electrode bodies between the V-shaped grooves 38 has reference character 39. It is noted that the major portion of the current flowing from the Monel electrode through the water will flow from the surfaces 39, and that a minor portion of the current will flow from between the surfaces 39 to maintain a striated field density of current per unit area between the electrodes. The water is subjected to the frequency of the supply source and its harmonics and also to the frequency of current density produced as the water passes through the striated field density of current per unit area maintained by the electrodes. In my description, I refer to a striated field as a field composed of alternate areas of current density with the current density of one area greater than the current density of another area. As the surfaces 39 are gradually worn away through operation of the treating device, the distance between the surfaces 39 and the graphite electrode 23 will be increased, thus introducing a longer path of water and increasing the resistance. By using the V-shaped groove between the surfaces 39, I have provided means for automatically increasing the surface area 39 as the distance between the surface and the graphite electrode is increased. Another value of using the V-shaped groove 38 is that it permits better cleaning of the surface 39 with the type of scraper which I have used.

An impeller 35 which rotates the shaft 34 and the Monel electrode 24 is fastened to the shaft 34 and located within the T 121. The impeller 35 is on the entrance end of the treating apparatus of device 11 and is rotated by the water flowing through the treating device. I have employed a baffle plate 46 which may be fastened by welding or other suitable means to the T 121 for directing the water against the impeller. Slidably mounted on the other end of the shaft and within the T 21 at the exit end of my water treating apparatus is a "bell" 36 which operates the switch 17. A ring of rubber-like material which may be compressed between the bell and the end of the outer tube 20 forms the bell seat 40. When water is flowing through the treating device 11, the bell 36 is forced away from the bell seat 40 to permit passage of water therebetween.

Inserted in each end of the outer tube 20 are bearings 37 which are made from electrically insulated material. The bearings 37 support the Monel electrode 24 in the center of the graphite electrode 23. The ceramic bearings 26 and 27 prevent the Monel electrode 24 from moving endwise within the graphite electrode 23. The ceramic bearing 26 may be molded in an end cap 41 which is screwed into the T 121 at the entrance end of my water treating apparatus. Centrally located in ceramic bearing 26 is a hole 42 into which the end of the shaft 34 may be inserted. A spring 43 between the end of the shaft 34 and the bottom of the hole 42 eliminates endwise play in the shaft. The ceramic bearing 26 forms an insulation between the Monel electrode and the cap 41 inserted in the T 121.

The ceramic bearing 27 may be molded into a threaded plug 47 which may be then screwed into the T 21 at the outlet end of the treating device 11. Centrally located in this ceramic bearing 27 and molded therein to give a water-tight fit, is a rod of electrical conducting material such for example, as the brass conductor 49. This brass conductor 49 extends partway through the ceramic bearing 27 and outwardly from the outer surface thereof. The shaft 34 extending into an opening in the other end of the ceramic bearing 27 is aligned with the brass conductor 49. I have inserted a spring 50 and a carbon brush 51 between the brass conductor 49 and the shaft 34 to provide means for conducting current to the Monel electrode. The lead wire 32 electrically connects the brass connector 49 to one terminal of the switch 17. The other terminal of the switch 17 is connected by conductor wire 132 to the secondary 16.

I have employed a permanent magnet 53 which is slidably mounted on the shaft 34 as a transmitting means whereby movement of the bell 36 by water pressure operates the switch 17. As shown in Figures 5 and 6 the permanent magnet is horseshoe-shaped and is slidably mounted in the openings 52 in the ceramic bearing 27 and also on the shaft 34. A Bakelite sleeve 56 inserted in the base of the permanent magnet insulates the magnet from the shaft. The permanent magnet is spaced from the bell by a coil spring 57 which extends therebetween. When the pressure of water flowing through the apparatus pushes the bell 36 away from the bell seat 40, which may comprise rubber-like material, the permanent magnet is pushed against studs 54 which extend outwardly from the ceramic material. A lever arm 55 is pivotally mounted on a pivot 155 disposed at the end of one of said studs 54. This pivot 155 is carried by the switch 17. These studs 54 then exert a magnetic force on the lever arm 55 and against the action of the spring 60 to close the contacts 65 of the switch 17. The spring 58 between the base of the magnet and the ceramic bearing 27 forces the magnet from the studs 54 to open the switch 17 when water ceases to flow through the apparatus 11. The spring 60 is fastened between the switch box and the lever arm to hold the lever arm in a position which keeps the switch contacts 65 open when water is not flowing in the apparatus. I have molded a threaded sleeve 62 into the ceramic material and have threaded the stud 54 into the sleeve to provide a means for adjusting the distance between the ends of the stud and the permanent magnet. A cap nut 63 which compresses a seal washer 64 between the cap nut 63 and the threaded sleeve 62 makes the connection water-tight. Other suitable means may be employed for maintaining a water-tight bearing. The cap nut 63 may be screwed on the stud 54. I have made the stud 54 of smaller cross-sectional area than the arm of the permanent magnet 53 to provide a high reluctance to the magnetic circuit whereby the air gap between the magnet arm and the stud must be substantially closed before the lever arm 55 is moved to close the switch 17.

In actual practice with a water treating device embodying a specific sample of my invention, I have discovered that with a voltage of 70 volts A. C. across the electrode terminals, I have a current of 5 amperes A. C. flowing through the electrodes. The electrical current flowing through the water and between the electrodes has two primary paths; a major path and a minor path. A major portion of the current flows directly through the water between the Monel and the graphite thus forming the major path. A minor portion of the current flows through the water from one of the electrodes to the tank or the connecting pipes which are at ground potential and back to the other electrode to form the minor path of current flow. It is here noted, that the path of current through the water from one electrode to the tank then to the other electrode is much smaller than the path directly between the electrodes. While my apparatus is in operation, I find a voltage drop of approximately 50 volts A. C. from the Monel electrode to the tank and a voltage drop of approximately 20 volts A. C. from the graphite electrode to the tank. With these voltage drops, there is approximately 75 milliamperes A. C. flowing through a meter connected between the graphite and the tank and approximately 150 milliamperes A. C. flowing between the Monel electrode and the tank.

I have also discovered a direct current potential is established between the electrodes and between the respective electrodes and the tank. The D. C. volts internally generated between the graphite and the Monel electrodes will change with variations in the concentration of the salts in the water which is being treated. In this particular apparatus, I find approximately 70 microvolts D. C. across the electrodes, that is, across the conductors 31 and 132. The direct current, as read on an ammeter connected in series with either the conductor 31 or 132 which indicates the current flowing between the graphite electrode and the Monel electrode is approximately $\frac{1}{10}$ milliampere D. C. The direct current, as read on an ammeter connected between the conductor 31 and the tank which indicates the current flowing between the graphite electrode and the tank is approximately $\frac{1}{10}$ milliampere D. C. The direct current, as read on an ammeter connected between conductor 132 and the tank which indicates the current flowing between the Monel electrode and the tank is approximately $\frac{4}{10}$ milliampere D. C. These values for direct current were observed while the apparatus was in operation and while there was alternating current potential between the electrodes. It is to be understood that these values of current and voltage were observed by means of high resistance meters connected between the electrodes and between the electrode and the tank, and are assumed to be the correct values of current flowing through the water for the specific sample, although other of the samples of my device may have different values. The values given are purely illustrative.

In operation, water flowing through the intake pipe 12 and into the tank 10 must pass through the water treating device or apparatus 11. As the water passes through the apparatus 11, the bell 36 is forced away from the bell seat 40 and moves the permanent magnet 53 to operate the switch 17 for energizing the graphite electrode and the Monel electrode. At the same time, water flowing against the impeller causes the Monel electrode to rotate thus providing means for the stationary wipers to continually clean that electrode. The scale forming salts or impurities of the water are subjected to electrical field dependent on their concentration in the water when an A. C. voltage is applied to the electrodes. It has been found these scale forming properties are inhibited and thus form a sludge instead of scale. This sludge is easily removed from the tank. It has also been discovered that scale already formed in the tank is softened. When the water has stopped flowing through the apparatus, the spring 59 moves the magnet from the studs to permit the spring 60 to open the switch 17, for stopping the passage of current through the water while the water is not flowing therethrough.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. An apparatus for preventing the formation of scale in a water tank comprising, a tubular housing of current conducting material electrically connected to said tank, a ceramic lining on the inside of said housing through which water containing scale forming salts may flow, a first sleeve shaped electrode mounted within and insulated from said housing and supported by said ceramic lining, a second electrode longitudinally disposed within said first electrode, one of said electrodes comprising graphite and the other of said electrodes comprising Monel, insulation support means for supporting said second electrode and for insulating the same from the first electrode and the housing, a transformer having a primary adapted to be connected to a source of A. C. potential and having a secondary capable of passing direct current, said secondary directly interconnecting said electrodes, said scale forming salts conducting current between the electrodes and between the electrodes and the tank to prevent scale forming on the tank.

2. An apparatus for preventing the formation of scale in a water tank comprising, a tubular housing of current conducting material electrically connected to said tank, a ceramic lining on the inside of said housing through which water containing scale forming salts may flow, a sleeve shaped graphite electrode mounted within and insulated from said housing and supported by said ceramic lining, a Monel electrode longitudinally disposed within said graphite electrode, insulation support means for supporting said Monel electrode and for insulating the same from the graphite electrode and the housing, and transformer means having a primary connected to the opposite terminals of a source of A. C. potential and having each end of the secondary directly connected to its respective electrode, said scale forming salts conducting current between the electrodes and between the electrodes and the tank to prevent scale forming on the tank.

3. An apparatus for preventing the formation of scale in a water tank comprising, a tubular housing of current conducting material electrically connected to said tank, a ceramic lining on the inside of said housing through which water containing scale forming salts may flow, a graphite sleeve shaped electrode mounted within and insulated from said housing and supported by said ceramic lining, a rotatable Monel electrode longitudinally disposed within said graphite electrode, insulation support means for rotatably supporting said Monel electrode and for insulating the same from the graphite electrode and the housing, wiping means carried by said graphite electrode for cleaning said Monel electrode as it is rotated, water impeller means fastened to said Monel electrode for rotating the same, and transformer means having a primary connected to the opposite terminals of a source of A. C. potential and having each end of the secondary directly connected to its respective electrode, said scale forming salts conducting current between the electrodes and between the electrodes and the tank to prevent scale forming on the tank.

4. An apparatus for treating scale forming salts in water entering a tank to prevent the salts forming a scale on the inside of the tank, said apparatus comprising, a leakage reactance transformer having a primary and a secondary, means for connecting the said primary to a source of alternating current, a graphite electrode electrically fastened to one end of the secondary winding and a Monel electrode electrically fastened to the other end of the said secondary winding with the said secondary winding providing direct current circuit between the graphite electrode and the Monel electrode, housing means of electrical conducting material through which the water flows into the tank, first support means of insulating material for supporting the said graphite electrode in the said housing means, second support means of insulating material for supporting the said Monel electrode in the said housing means and in operative relationship with the said graphite electrode, said scale forming salts establishing a first path of current flow between the said electrodes and establishing a second path of current flow from the graphite electrode to the tank and from the tank to the Monel electrode, and switch means mounted on the housing and operated by flow of water through the housing for controlling the energization of said electrodes, said switch means permitting energization of the electrodes upon flow of water through the housing.

5. An apparatus for treating scale forming salts in water entering a tank to prevent the salts forming a scale on the inside of the tank, said apparatus comprising, a transformer having a primary and a secondary, means for connecting the said primary to a source of alternating current, a graphite electrode wired to one end of the secondary winding and a Monel electrode wired to the other end of the said secondary winding with the said secondary winding providing direct current circuit between the graphite electrode and the Monel electrode, housing means of electrical conducting material through which the water flows into the tank, first support means of insulating material for supporting the said graphite electrode in the said housing means, second support means of insulating material for supporting the said Monel electrode in the said housing means and in operative relationship with the said graphite electrode, wiping means carried by and extending longitudinally of one of said electrodes for cleaning the other electrode, water impeller means fastened to one of said electrodes for rotating the same, and switch means mounted on the housing and operated by flow of water through the housing for controlling the energization of said electrodes, said switch means permitting energization of the electrodes upon flow of water through the housing.

WILLIAM S. HLAVIN.

REFERENCES CITED

The following references are of record in the file of this patent:

UNITED STATES PATENTS

| Number | Name | Date |
|---|---|---|
| 525,304 | Woods | Aug. 28, 1894 |
| 535,267 | Wagner et al. | Mar. 5, 1895 |
| 1,038,122 | Hagg | Sept. 10, 1912 |
| 1,773,274 | Neeley | Aug. 19, 1930 |
| 2,136,895 | Sola | Nov. 15, 1938 |
| 2,291,644 | McNitt | Aug. 4, 1942 |
| 2,392,687 | Nachtman | Jan. 8, 1946 |

FOREIGN PATENTS

| Number | Country | Date |
|---|---|---|
| 176,457 | Great Britain | Feb. 27, 1922 |
| 271,721 | Great Britain | June 2, 1927 |
| 366,652 | Great Britain | Feb. 11, 1932 |
| 185,845 | France | Sept. 14, 1887 |